US012783994B2

(12) United States Patent
Jalgaonkar et al.

(10) Patent No.: US 12,783,994 B2
(45) Date of Patent: Nov. 3, 2026

(54) SYSTEM AND METHOD FOR TRANSLATING SLICE MANAGER INVENTORY DATA

(71) Applicant: Rakuten Mobile, Inc., Tokyo (JP)

(72) Inventors: Vrushali Rajendra Jalgaonkar, Tokyo (JP); Jyoti Bose, Tokyo (JP); Jithin Chathankandath, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 473 days.

(21) Appl. No.: 18/252,188

(22) PCT Filed: Jan. 24, 2023

(86) PCT No.: PCT/US2023/011390

§ 371 (c)(1),
(2) Date: May 9, 2023

(87) PCT Pub. No.: WO2024/158381

PCT Pub. Date: Aug. 2, 2024

(65) Prior Publication Data

US 2025/0078020 A1 Mar. 6, 2025

(51) Int. Cl.

| | |
|---|---|
| ***G06Q 10/087*** | (2023.01) |
| ***H04L 41/122*** | (2022.01) |
| ***H04L 41/5019*** | (2022.01) |
| ***H04L 47/78*** | (2022.01) |
| ***H04W 24/02*** | (2009.01) |

(52) U.S. Cl.

CPC .................................. *G06Q 10/087* (2013.01)

(58) Field of Classification Search

CPC . G06Q 10/087; H04L 41/5019; H04L 41/145; H04L 45/64; H04L 47/78; H04L 41/122; H04W 24/02

See application file for complete search history.

(56) References Cited

U.S. PATENT DOCUMENTS

| | | | | |
|---|---|---|---|---|
| 12,376,026 | B2 * | 7/2025 | Kita et al. | H04W 48/18 |
| 12,519,698 | B2 * | 1/2026 | Cui et al. | H04L 41/12 |
| 2012/0030311 | A1 | 2/2012 | Refai et al. | |
| 2021/0112428 | A1 * | 4/2021 | Young et al. | H04W 24/08 |
| 2021/0144790 | A1 * | 5/2021 | Faccin et al. | H04W 76/18 |
| 2021/0368514 | A1 * | 11/2021 | Xing | H04W 72/08 |
| 2022/0197773 | A1 * | 6/2022 | Butler et al. | G06F 11/3495 |
| 2023/0078490 | A1 * | 3/2023 | Sanneck et al. | G05B 19/418 |

(Continued)

FOREIGN PATENT DOCUMENTS

| | | | | |
|---|---|---|---|---|
| EP | 4113911 A1 | | 1/2023 | |
| WO | WO 2019174735 A1 | * | 9/2019 | H04W 48/00 |

(Continued)

OTHER PUBLICATIONS

Fairas et al., A Systematic Review of Shared Sensor Networks, Feb. 2016 (Year: 2016).*

(Continued)

*Primary Examiner* — William C Vaughn, Jr.

(74) *Attorney, Agent, or Firm* — HAUPTMAN HAM, LLP

(57) ABSTRACT

A method includes creating, by a processor and based on a network slice design submitted by a user, a network slice; and generating, automatically by the processor, a network slice selection assistance information ID (nSSAI ID) for the network slice.

17 Claims, 6 Drawing Sheets

(56) References Cited

U.S. PATENT DOCUMENTS

| | | | | |
|---|---|---|---|---|
| 2023/0123074 | A1 * | 4/2023 | Ahmed et al. | H04W 24/02 |
| 2024/0007876 | A1 * | 1/2024 | Guilbeault et al. | H04W 24/04 |
| 2024/0259879 | A1 * | 8/2024 | Ranganath et al. | H04W 28/18 |
| 2025/0071669 | A1 * | 2/2025 | Ishii | H04W 48/18 |
| 2025/0097833 | A1 * | 3/2025 | Ishii | H04W 48/18 |

FOREIGN PATENT DOCUMENTS

| | | | | | |
|---|---|---|---|---|---|
| WO | WO 2019238253 | A1 * | 12/2019 | | H04L 12/24 |
| WO | WO 2020200469 | A1 * | 10/2020 | | H04W 36/00 |
| WO | WO 2020263374 | A1 * | 12/2020 | | G06F 11/34 |
| WO | 2022074436 | A1 | 4/2022 | | |

OTHER PUBLICATIONS

Transtzas et al., Defining management function based architecture for 5G Network Slicing, Jul. 2021 (Year: 2021).*

Transtzas et al., Defining Management function based architecture for 5G Network Slicing (Year: 2021).*

Farias et al. A Systematic Review of Shared Sensor Networks (Year: 2016).*

"Principles for a Telecommunications management network; M.3010 (Feb. 2000)", ITU-T Standard in Force (I), International Telecommunication Union, Feb. 1, 2000 (Feb. 1, 2000), No. M.3010 (Feb. 2000), XP017402171, Geneva, CH, 44pp.

* cited by examiner

SYSTEM AND METHOD FOR TRANSLATING SLICE MANAGER INVENTORY DATA

RELATED APPLICATIONS

The present application is a National Phase of International Application No. PCT/US2023/011390, filed Jan. 24, 2023.

TECHNICAL FIELD

This description relates to a system for translating slice manager inventory data and method of using the same.

BACKGROUND

A cellular network is a telecommunication system of mobile devices (e.g., mobile phone devices) that communicate by radio waves through one or more local antenna at a cellular base station (e.g., cell tower). The coverage area in which service is provided is divided into small geographical areas called cells. Each cell is served by a separate low-power-multichannel transceiver and antenna at the cell tower. Mobile devices within a cell communicate through that cell's antenna on multiple frequencies and on separate frequency channels assigned by the base station from a pool of frequencies used by the cellular network.

A radio access network (RAN) is part of the telecommunication system and implements radio access technology. RANs reside between a device, such as a mobile phone, a computer, or remotely controlled machine, and provides connection with a core network (CN). Depending on the standard, mobile phones and other wireless connected devices are varyingly known as user equipment (UE), terminal equipment (TE), mobile station (MS), and the like.

SUMMARY

In some embodiments, a method includes receiving, by processor, a request for inventory data from a slice manager; requesting, by the processor, the inventory data from one or more system inventories; receiving, by the processor, the requested inventory data from an inventory; translating, by the processor, the requested inventory data into a slice manager data model; and sending, by the processor, the translated requested data.

In some embodiments, an apparatus includes a processor; and a memory having instructions stored thereon that, when executed by the processor, cause the apparatus to receive a request for inventory data from a slice manager; request the inventory data from one or more system inventories; receive the requested inventory data from an inventory; translate the requested inventory data into a slice manager data model; and send the translated requested data.

In some embodiments, a non-transitory computer readable medium having instructions stored thereon that, when executed by a processor, cause an apparatus to receive a request for inventory data from a slice manager; request the inventory data from one or more system inventories; receive the requested inventory data from an inventory; translate the requested inventory data into a slice manager data model; and send the translated requested data.

BRIEF DESCRIPTION OF THE DRAWINGS

Aspects of the embodiments are understood when read with the accompanying Figures. In accordance with the standard practice in the industry, various features are not drawn to scale. In some embodiments, dimensions of the various features are arbitrarily increased or reduced for clarity of discussion.

DETAILED DESCRIPTION

Figure 1:
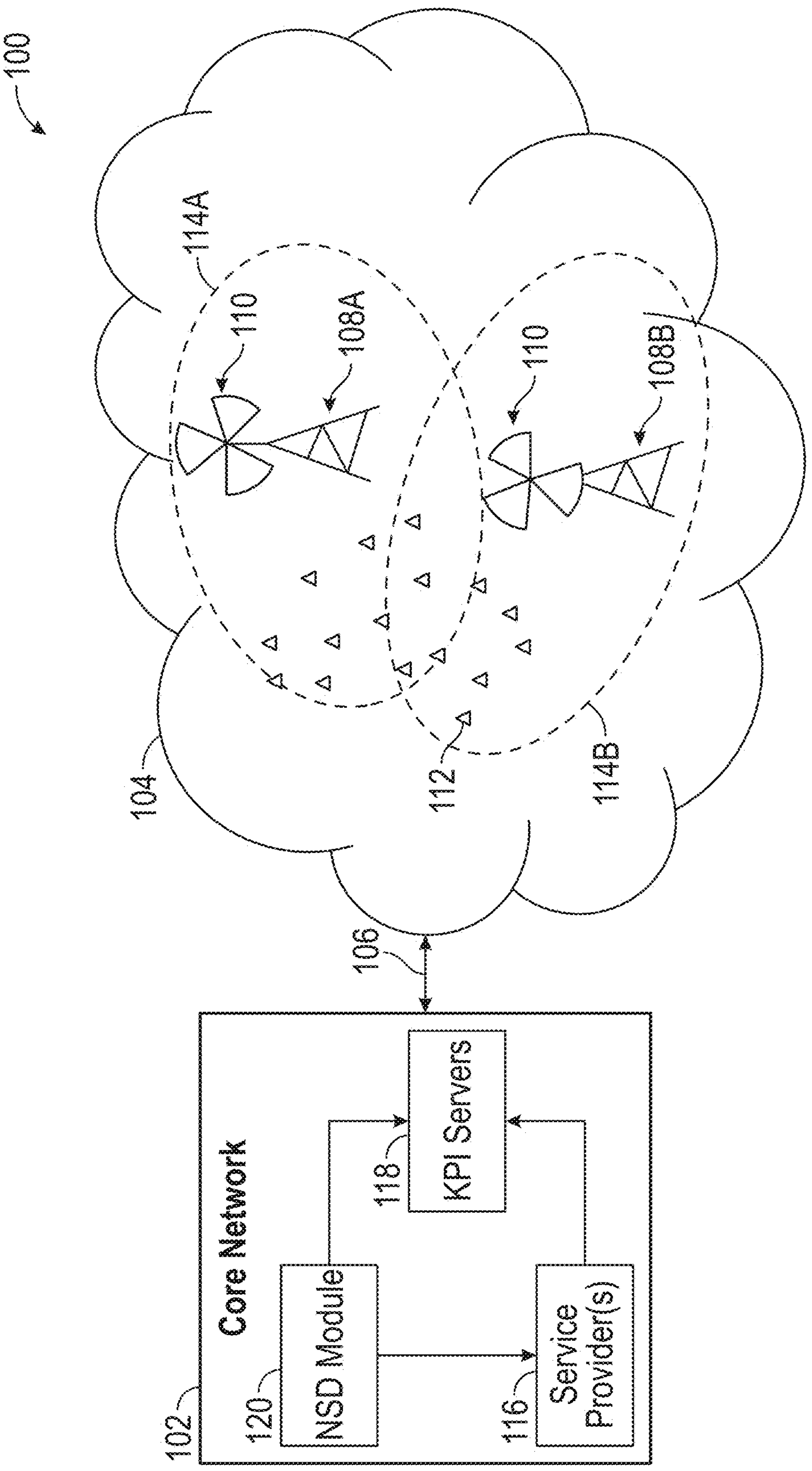
FIG. 1 is a diagrammatic representation of a system for network slice design (NSD), in accordance with some embodiments.

The following embodiments provide many different examples for implementing distinctive features of the discussed subject matter. Examples of components, values, operations, materials, arrangements, or the like, are described below to simplify the embodiments. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, the present disclosure repeats reference numerals and/or letters in the numerous examples. This repetition is for the purpose of simplicity and clarity and is unintended to dictate a relationship between the various embodiments and/or configurations discussed.

Further, spatially relative terms, such as beneath, below, lower, above, upper and the like, are used herein for ease of description to describe one element or feature's relationship to another element(s) or feature(s) as illustrated in the Figures. The spatially relative terms are intended to encompass different orientations of the device in use or operation in addition to the orientation depicted in the Figures. In response to the apparatus being otherwise oriented (rotated 90 degrees or at other orientations), the spatially relative descriptors used herein likewise are interpreted accordingly.

Network slicing is a method of creating multiple unique logical and virtualized networks over a common multi-domain infrastructure. Using software-defined networking (SDN), network function virtualization (NFV), orchestration, analytics, and automation, network operators manually create network slices that support a specific application, service, set of users, or network. Network slices are able to be configured to span multiple network domains, such as an access networks (a user network, such as a RAN, that connects subscribers to a service provider and, through the transport network, to other networks such as the Internet), a CNs (the core network is a central conduit designed to transfer network traffic at high speeds), and a transport networks (the public telecommunications infrastructure which permits telecommunications between and among defined network termination points) deployed across multiple network operators.

Network slicing supports services with varying network requirements, such as a connected vehicle to a voice call, which requires different throughput, latency, and reliability compared to data communication with internet of things (IoT) devices. With network slicing, each slice is configured to have a different architecture, management, and security to support a particular use. While functional components and resources are shared across network slices, capabilities such as data speed, capacity, connectivity, quality, latency, reliability, and services are customized in each slice to conform to a specific service level agreement (SLA) with a vendor.

A network slice is broken up into network service (NS) subnets where each subnet is dedicated to a domain (e.g., RAN, CN, transport domain, or E2E that includes each). The transport domain references the telecommunication transmission facilities under which voice, data, and video communications are distributed between distant locations for use on a shared basis. Within a NS subnet is one or more network services. Within a network service is one or more network functions.

In some embodiments, a slice manager inventory translator is discussed. In some embodiments, a method for translating slice manager inventory is discussed.

A slice manager interfaces with the various functionalities performed by each layer (e.g., the service layer, the network function layer, and infrastructure layer) to coherently manage each slice request. A slice manager enables efficient and flexible slice creation that is reconfigurable. A slice manager provides end-to-end (E2E) service management including mapping of various service instances, expressed in terms of SLA requirements, with suitable network functions capable of satisfying the service constraints. Slice manager provides slice life-cycle management, such as slice performance monitoring to dynamically reconfigure each slice to accommodate possible SLA requirements modifications.

In other approaches, slice managers operate with vendor-specific inventories. In some embodiments, a translator service makes the interaction between the slice manager and the inventory more efficient.

In other approaches a slice manager's resilience and availability is affected by the system inventory. In computer networking, resilience is the ability to provide and maintain an acceptable level of service in the face of faults and challenges to normal operation. Availability is the probability that an item operates satisfactorily at a given point in time when used under stated conditions in an ideal support environment.

Different inventories/vendors bring different data models, and these data models are translated inside the slice manager application. For every new inventory system integration, the slice manager application is called upon to be customized. This is a barrier to integrating the slice manager with different types of inventory systems.

A data model is an abstract model that organizes elements of data and standardizes how the elements of data relate to one another and to the properties of real-world entities. For instance, a data model that specifies that a data element representing a car be composed of several other elements which, in turn, represent the color and size of the car and define the owner. A data model explicitly determines the structure of data.

The system inventory is a slice manager's data source to understand the data center's infrastructure. For the slice manager to perform configuration the system inventory is accessed. Thus, the slice manager is not deployable independently of the system inventory.

Since the slice manager integrates directly with the system inventory, any kind of outage and maintenance on the system inventory, causes downtime for the slice manager. Thus, the system is less available and less resilient.

In some embodiments, the slice manager is decoupled from the inventory and interacts with an interfacing system called a slice manager inventory translator which completely abstracts the system inventory or any other inventory. In some embodiments, the translator system allows configuration of the input/output (the communication between the system inventory and the slice manager) based on the output data model of the system inventory.

In some embodiments, an inventory translator interface system converts inventory data to a data model of the slice manager. In some embodiments, the inventory translator system has a persistence layer (a software layer that allows a program to persist in a state for a period) to allow the slice manager to work independently of the system inventory for a defined period. In some embodiments, the slice manager integrates with different types of inventory systems. In some embodiments, the slice manager has increased availability and resiliency. In some embodiments, the slice manager is deployed independently without a system inventory. In some embodiments, the slice manager performance increases as the translation is performed ahead of time.

In some embodiments, the Inventory translator obtains data from an inventory system and converts the data into the slice manager data model. In some embodiments, in response to successfully converting the data, the data persists in a transient inventory. In some embodiments, the process continues periodically or in an on-demand basis. In some embodiments, the inventory translator is manually configured to fetch the data from the inventory system.

In some embodiments, the slice manager, orchestrator (provides the automated configuration, coordination, and management of computer systems and software), a correlation and policy engine (CPE) or any other external services interact directly with the inventory through the inventory translator. A CPE is a software application that programmatically understands relationships. CPEs are configured to be used in system management tools to aggregate, normalize, and analyze event data. Event correlation is a technique for making sense of many events and pinpointing the few events that are important in a mass of information. This is accomplished by looking for and analyzing relationships between events. Further, a CPE is a program or process that receives machine-readable policies and applies them to a particular problem domain to constrain the behavior of network resources.

In some embodiments, in response to the inventory system being down, the slice manager, orchestrator, CPE or any other external services works with persistent inventory translator provided data.

In some embodiments, the slice manager translator includes a data model mapper, vendor, application programming interface (API) and plugin mapper, scheduler, persistence service and availability service. An API is a way for two or more computer programs to communicate with each other. An API is a type of software interface, offering a service to other pieces of software. An API connects computers or pieces of software to each other.

In some embodiments, mapping is the one-to-one relationship between each element in a data model and the data model's corresponding element in a database. With the mapping, each operation which refers to an element in a database and is translated using the data model into a corresponding data model element.

In some embodiments, the data model mapper converts the system inventory data into the slice manager specific data model. In a non-limiting example, in response to the different system inventories including different slice identifications (IDs) (e.g., slice_id, instance_id, SLICE ID, and slice_no where instance_id, SLICE ID, and slice_no are the slice ids of different system inventories), the data model mapper maps the different inventory IDs with the slice ID defined in the slice manager data model.

In some embodiments, the vendor API and plugin mapper maps the system inventory API's details based on the vendor. In some embodiments, the scheduler periodically checks the system inventory APIs, and the slice manager translator fetches the data from the system inventory pursuant to a scheduled time in the scheduler. In some embodiments, the persistence service stores inventory data into a transient inventory. In some embodiments, in response to the system inventory service being down, the slice manager works independently for a defined period. In some embodiments, the availability service checks whether the system inventory service is available. In response to the system inventory being available, then the availability service notifies the slice manager to work directly with the system inventory. In response to the system inventory being unavailable, then the availability service notifies the slice manager to get data from the transient inventory database.

FIG. 1 is a diagrammatic representation of a system for network slice design (NSD) 100, in accordance with some embodiments.

NSD system 100 includes a CN 102 communicatively connected to RAN 104 through transport network 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, KPI servers 118, and network slice module (NSDM) 120.

CN 102 (further known as a backbone) is domain that is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is an access network domain. In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between UE 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, transport network 106 of NSD system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and UE 112 begins with transport network 106 connected to CN 102. In some embodiments, transport network 106 includes wired, fiber optic, and wireless components. Wireless sections include using microwave bands, mesh, and edge network topologies that use high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, base stations are replaced or supplemented with edge devices configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 1822 (FIG. 18), providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate.

Service provider(s) 116 are businesses, vendors, customers, or organizations that sell bandwidth or network access to subscribers (utilizing UEs) by providing direct Internet backbone access to Internet service providers and usually access to network access points (NAPs). Service providers are sometimes referred to as backbone providers, Internet providers, or vendors. Service providers include telecommunications companies, data carriers, wireless communications providers, Internet service providers, and cable television operators offering high-speed Internet access.

KPI servers 118 produce both predictions and live network data. Live-network data (KPIs, UE/cell/MDT (minimization of drive test) traces, and crowdsourced data) that allows for modelling of network traffic, hot-spot identification, and radio signal propagation. RF drive testing is a method of measuring and assessing the coverage, capacity, and Quality of Service (QOS) of a mobile radio network, such as RAN 104. The technique consists of using a motor vehicle containing mobile radio network air interface measurement equipment that detects and records a wide variety of the physical and virtual parameters of mobile cellular service in each geographical area. By measuring what a wireless network subscriber experiences in an area, wireless carriers make directed changes to networks that provide better coverage and service to customers. Drive testing commonly is configured with a mobile vehicle outfitted with drive testing measurement equipment. The equipment is usually highly specialized electronic devices that interface to original equipment manufacturer (OEM) mobile handsets (UEs). This ensures measurements are realistic and comparable to actual user experiences. For mobile networks, crowdsourcing methodology leverages a crowd of participants (e.g., the mobile subscribers) to gather network measurements, either manually or automatically through mobile apps, or directly from the network using call traces.

UE/cell/MDT traces collected at the operations support systems (OSS) or through dedicated tools provide service provider(s) 116 with user-level information. Once geolocated, UE/cell/MDT traces are used to enhance path-loss calculations and prediction plots, as well as to identify and locate problem areas and traffic hotspots. KPI servers 118 allow service provider(s) 116 to use UE/cell/MDT traces along with NSDM 120 for network optimization.

In some embodiments, NSD module 120 is configured to allow a user to design one or more network slices. In some embodiments, the network slice design is GUI based. In some embodiments, operations include a user inputting basic information such as, network slice name, slice type, domains, and shared or non-shared slice selection. Other operations include defining a slice such as, service profile parameters (contains the original requirement of communication-service-instance, such as latency, data-rate, and mobility-level) requested by a northbound interface (e.g., internal to the system or manually from a user) and conversion of service profile parameters to slice profile parameters (contains the slice subnet parameter info of different network domain slice subnet instances (NSSIs), such as RAN, transport network (TN), and CN NSSI).

Figure 2:
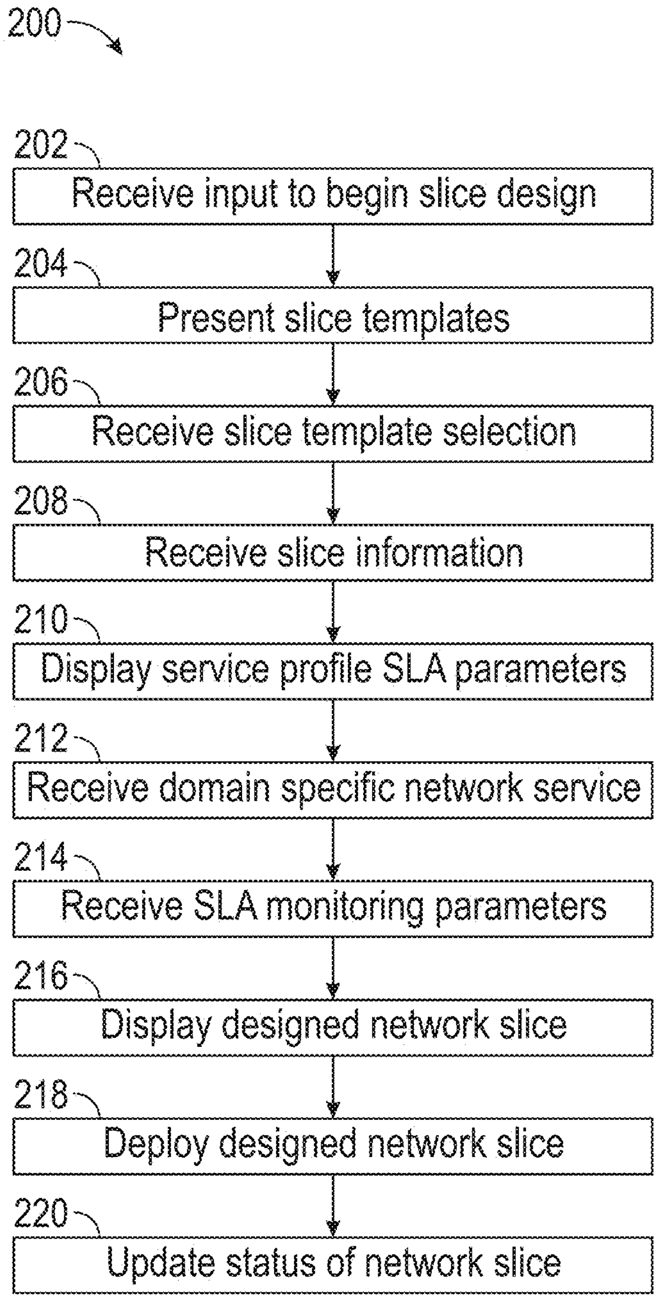
FIG. 2 is a flow diagram of method for designing a network slice, in accordance with some embodiments.

FIG. 2 is a flow diagram for a method of designing a network slice 200, in accordance with some embodiments.

In some embodiments, NSD method 200 describes process tasks of network slice design. While the operations of NSD method 200 are discussed and shown as having a particular order, each operation in NSD method 200 is configured to be performed in any order unless specifically called out otherwise. NSD method 200 is implemented as a set of operations, such as operations 202 through 220.

At operation 202 of NSD method 200, NSDM 120 receives an input from a user to begin network slice design. In some embodiments, the user is presented with a graphical user interface (GUI) indicating a network slice design application is starting. Process flows from operation 202 to operation 204.

The GUI is a form of user interface (UI) that allows users to interact with electronic devices through graphical icons and audio indicators such as primary notation, instead of text-based UIs, typed command labels or text navigation. The actions in a GUI are usually performed through direct manipulation of the graphical elements.

At operation 204 of NSD method 200, NSDM 120 presents, through a GUI, a list of slice templates. In some embodiments, each network slice in a slice template list includes a status (e.g., active, or inactive), a name, a slice service type (e.g., eMBB, uRLLC, mIoT, or custom), a service category (such as home automation, high speed train, or the like), a domain (RAN, TN, CN, or E2E), a vendor, version, shared (or not), created date, and last modified date. The term template refers to a feature of a software application that defines a unique non-executable file format intended specifically for that application. Process flows from operation 204 to operation 206.

At operation 206 of NSD method 200, NSDM 120 receives a user input, through the GUI, indicating a selection of a slice template. In some embodiments, a user points to a slice template then clicks on the slice template. In some embodiments, a user clicks on user selection button to begin the process of creating a new slice with the selected slice template. Process flows from operation 206 to operation 208.

At operation 208 of NSD method 200, a GUI is presented, and the user inputs, through the GUI, foundational slice information. In some embodiments, a user inputs a slice name, selects a slice type (e.g., eMBB, URLLC type of slice, or the like), selects domains, and selects whether the slice is shared or dedicated. For example, the user selects a shared or dedicated slice subnet for each domain (RAN, CN, TN, or a combination of each) and coverage area of the network slice. In some embodiments, a public land mobile network (PLMN) selection is based upon the coverage area selected. Process flows from operation 208 to operation 210.

At operation 210 of NSD method 200, a GUI is presented, and the user sets network slice parameters. In some embodiments, at a slice parameter GUI, service profile SLA parameters are presented and configured so the user modifies the parameters as applicable (e.g., according to an SLA). In a non-limiting example, a user modifies an expected latency to fit the specifications of the network slice (e.g., set at 300 ms). In some embodiments, a slice manager calculates slice profile parameters of each domain (RAN, CN, and TN) to meet service profile SLAs. In some embodiments, this process is repeated for each domain. Process flows from operation 210 to operation 212.

At operation 212 of NSD method 200, a GUI is presented, and the user selects a subnet profile, such as an already deployed domain specific network service (a shared network service or a dedicated network service). In some embodiments, the user navigates to slice subnet profile GUI, where the user selects a network slice subnet name for each domain. In some embodiments, a network service associated with the slice subnet is displayed. In some embodiments, in response to a network service being absent or unassociated with the network slice subnet, the user is further able to select a network service template.

In some embodiments, a GUI is presented, and the user is presented with a select network services pop-up box. In some embodiments, in network services box, each of the network services, such as user plane function (UPF is responsible for packet routing and forwarding, packet inspection, quality of service (QOS) handling, and external protocol data unit (PDU) session for interconnecting data network (DN) in a 5G architecture), network repository function (NRF acts as a central services broker for all network functions (NFs) in the 5G Core), or session management function (SMF is responsible for interacting with the decoupled data plane, creating updating and removing PDU sessions and managing session context with the UPF). In a non-limiting example, a user selects UPF (shown as highlighted) and a user is presented with an indication (e.g., true) that the UPF network service is shared. A user selects network services from network services list and a box displays the network functions associated with the selected network services selected by the user from network services list.

Alternatively, a GUI displays NRF as highlighted in network services box and false is the indication presented within shared user input field indicating the NRF network service is not shared. The user inputs network services information in template for a dedicated network service. The user selects a network services template in NS template user selection field. In response to selection of a network service template (e.g., UPF NST), the user is presented with network functions box. In network functions box the user selects a network function (such as UPF app and UPF DB where the user selects the distributed unit type, distributed unit code, and cluster ID).

A GUI is presented after each of the domains (RAN, core, and transport) include a network service. Once each domain includes a network service, NSDM 120 determines whether the selected network services are ready to serve the new network slice.

In some embodiments, a GUI is presented in response to the feasibility test failing for one or more domains (e.g., the RAN domain). In some embodiments, the user selects another slice subnet and rechecks the feasibility.

In some embodiments, a GUI is presented when the feasibility test is successful for each domain. In response to a successful feasibility test, the user deploys the network slice. In some embodiments, without a successful feasibility test, the user is unable to move forward with the network slice design. Process flows from operation 212 to operation 214.

At operation 214 of method 200, a GUI is presented, and the user selects SLA parameters, such as parameters and KPIs, to be monitored for the network slice based on one or more SLA agreements. In some embodiments, a user searches for parameters or KPIs for a selected domain. In some embodiments, the user drags and drops parameters/KPIs. Further, in response to the slice being deployed and selection of parameters/KPIs to be monitored, the user selects a policy for slice automated healing use-cases. Auto healing is a function that automatically detects disabled access points and restores the wireless network. Process flows from operation 214 to operation 216.

At operation 216 of method 200, a designed network slice is displayed on a GUI for the user's review. In some embodiments, a GUI is displayed with a list of network slices. Process flows from operation 216 to operation 218.

At operation 218 of method 200, a user deploys the designed network slice by clicking on the desired network slice in list of network slices, which displays pop up box. In some embodiments, the slice manager makes an API call to the orchestrator (not shown) and the designed slice is deployed. Process flows from operation 218 to operation 220.

At operation 220 of method 200, the status of the designed slice is updated. In some embodiments, the status of the network slice is updated from designed to deployed. Other statuses include running, activation failed, deployment failed.

Figure 3:
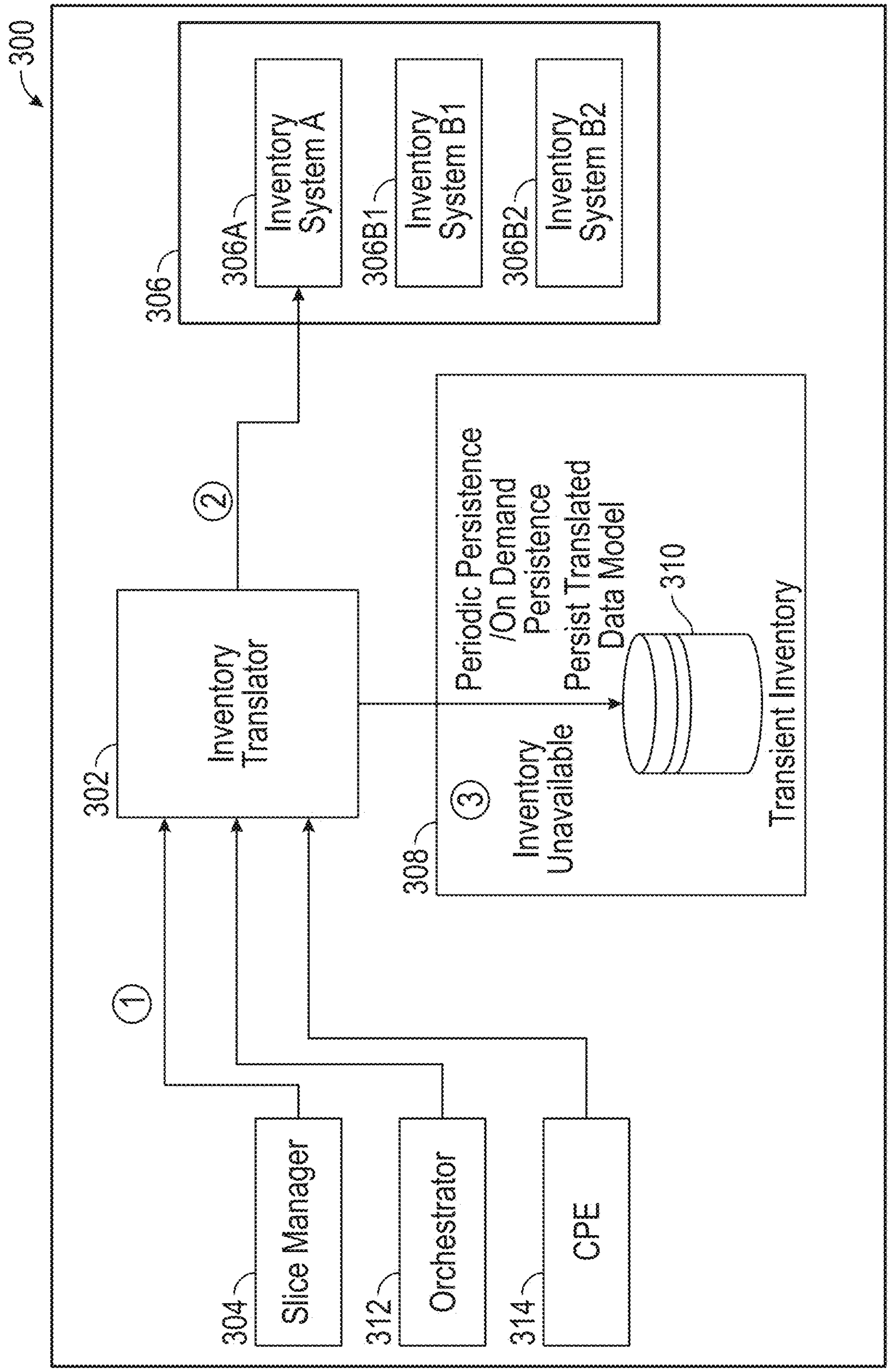
FIG. 3 a block diagram of a slice manager inventory translator system, in accordance with some embodiments.

FIG. 3 a block diagram of a slice manager inventory translator system 300, in accordance with some embodiments.

Slice manager inventory translator system 300 includes an inventory translator 302 that is operably connected and interacts with slice manager 304 and an inventory system 306, such as inventory systems 306A, 306B1, and/or 306B2. Inventory translator 302 is further operably connected to orchestrator 312, CPE 314, and transient inventory 310 included in persistence layer 308. As discussed above, inventory translator 302 converts inventory data from each inventory system 306 into the data utilized by slice manager 304 utilizing a data model. In some embodiments, performance is significantly improved as slice manager 304 no longer performs the processing power to perform the inventory translation. In some embodiments, inventory translator 302 preprocesses data for use by slice manager 304, thus improving processing time. In some embodiments, that it, the inventory translation is performed before the slice manager 304 requests the translation.

In FIG. 3 slice manager 304 is decoupled from inventory systems 306A, 306B1, and 306B2 and instead is operably connected and interacts with slice manager inventory translator 302 which abstracts system inventories 306A, 306B1, and 306B2. As discussed, slice manager translator system 300 provides inventory translator 302, which is configured to provide converted inventory data to slice manager 304 through mapping an inventory data model to the slice manager data model.

Inventory translator 302 further includes a persistence layer 308 which allows slice manager 304 to work independently of inventory system 306 for a period by storing transient inventory within database 310. In some embodiments, persistence layer 308 is a software layer that allows slice manager 302, orchestrator 312, and/or CPE 314 to persist in an operational state even when inventory systems 306A, 306B1, and 306B2 are down for a period (e.g., 100 ms, 100s, 100 mins, or 100 hours). In some embodiments, persistence layer 308 achieves persistence using an underlying database, such as transient inventory database 310. In some embodiments, transient inventory database 310 stores enough data from inventory system 306, such as inventory systems 306A, 306B1, and 306B2, for slice manager 304, orchestrator 312, and/or CPE 314 to operate for a period in the event inventory system 306 went down or not operational.

Slice manager 304, orchestrator 312, CPE 314 or any other external services interact directly with inventories 306A, 306B1, and 306B2 through inventory translator 302. In response to the slice manager inventory system 300, such as inventory systems 306A, 306B1, and 306B2, being down, slice manager 304, orchestrator 312, CPE 314 or any other external services work with inventory translator 302 to provide data through persistence layer 308 and obtaining and exchanging data with transient inventory 310 for a period.

Figure 4:
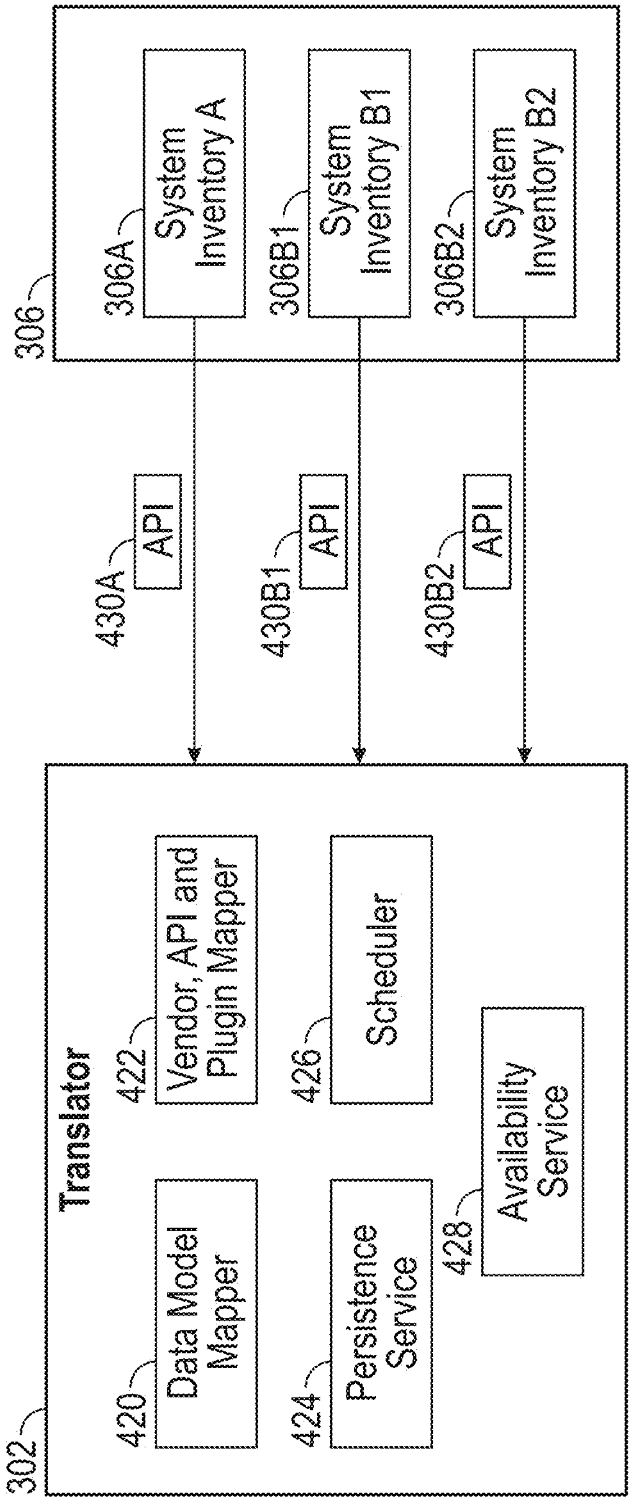
FIG. 4 a block diagram of an inventory translator, in accordance with some embodiments.

FIG. 4 a block diagram of an inventory translator 302, in accordance with some embodiments.

In some embodiments, inventory translator 302 is similar to slice manager inventory translator 302 of FIG. 3. Inventory translator 302 includes a data model mapper 420, a vendor, API, and plugin mapper 422, a persistence service 424, a scheduler 426, and an availability service 428.

In some embodiments, data model mapper 420 is a data access layer that performs bidirectional transfer of data between a persistent data store (e.g., inventory systems 306A, 306B1, and 306B2) and an in-memory data representation (the domain layer). The goal of the data model is to keep the in-memory representation and the persistent data store independent of each other and data mapper 420. This is useful when one needs to model and enforce strict business processes on the data in the domain layer that do not map neatly to the persistent data store. The layer is composed of one or more mappers (or data access objects) within data model mapper 420, performing the data transfer. In some embodiments, data model mapper 420 is a mapper that handles many different domain entity types (e.g., vendor inventories). In some embodiments, data model mapper 420 is a dedicated mapper that handles one or more domain entity types.

Data model mapper 420 maps a one-to-one relationship between each element in one or more data models included with data model mapper 420 and corresponding elements in a database, such as inventories 306A, 306B1, and 306B2. Data model mapper 420 refers to a data element in an inventory, such as inventories 306A, 306B1, and 306B2, and translates the data, using a data model, into a corresponding data model element that is sent to a slice manager, such as slice manager 304, an orchestrator, such as orchestrator 312, or a CPE, such as CPE 314.

In some embodiments, in situations where the different system inventories, such as inventories 306A, 306B1, and 306B2, have slice in a respective data model, data model mapper 420 maps the different inventory slice IDs with one slice ID defined in the slice manager data model.

Vendor API and plugin mapper 422 maps the system inventory APIs, such as system inventory APIs 430A, 430B1, and 430B2, details with vendor information. In some embodiments, vendor API and plugin mapper 422 maps the correct API for communication between the system inventory and inventory translator 302. In some embodiments, the selected API is then plugged in to implement communication between the system inventory and inventory translator 302.

In some embodiments, vendor API and plugin mapper 422 pings the APIs, such as APIs 430A, 430B1, and 430B2, to obtain information about the APIs. Next vendor API and plugin mapper 422 maps the different APIs with vendor information. Next vendor API and plugin mapper 422 schedules time which is set in scheduler 426.

In computing, scheduling is the action of assigning resources to perform tasks. The tasks are threads, processes, or data flows. The scheduling activity is carried out by scheduler 426. Scheduler 426 is designed to keep computer resources busy (as in load balancing), allow multiple users, such as slice manager 304, orchestrator 312, and CPE 314, to share system resources effectively, or to achieve a target quality-of-service (QOS). Scheduler 426 periodically checks system inventory APIs, such as system inventory APIs 430A, 430B1, and 430B2. And inventory translator 302 fetches data from the system inventory, such as inventories 306A, 306B1, and 306B2, as per scheduled time in scheduler 426.

In computer science, persistence refers to the characteristic of a state of a system that outlives (persists more than) the process that created the state of the system. This is achieved by storing the state as data in computer data storage, such as transient inventory 310. Persistence service 424 transfers data to and from storage devices, such as inventories 306A, 306B1, and 306B2, and provides mappings from the native programming-language data structures to the storage device data structures.

Persistence service 424 stores the inventory data, from the system inventory, into transient inventory 310 through persistence layer 308. In response to the system inventory service being down, slice manager 304, orchestrator 312, and/or CPE314 function independently for a defined period.

Availability service 428 determines whether the system inventory, such as inventories 306A, 306B1, and 306B2, are available. In response to the system inventory being available, then availability service 428 informs slice manager 304, orchestrator 312, and/or CPE 314 to work directly with the system inventory. And, in response to system inventory 306 being unavailable, then availability service 428 informs slice manager 304, orchestrator 312, and/or CPE 314 to obtain data from transient inventory 310.

Figure 5:
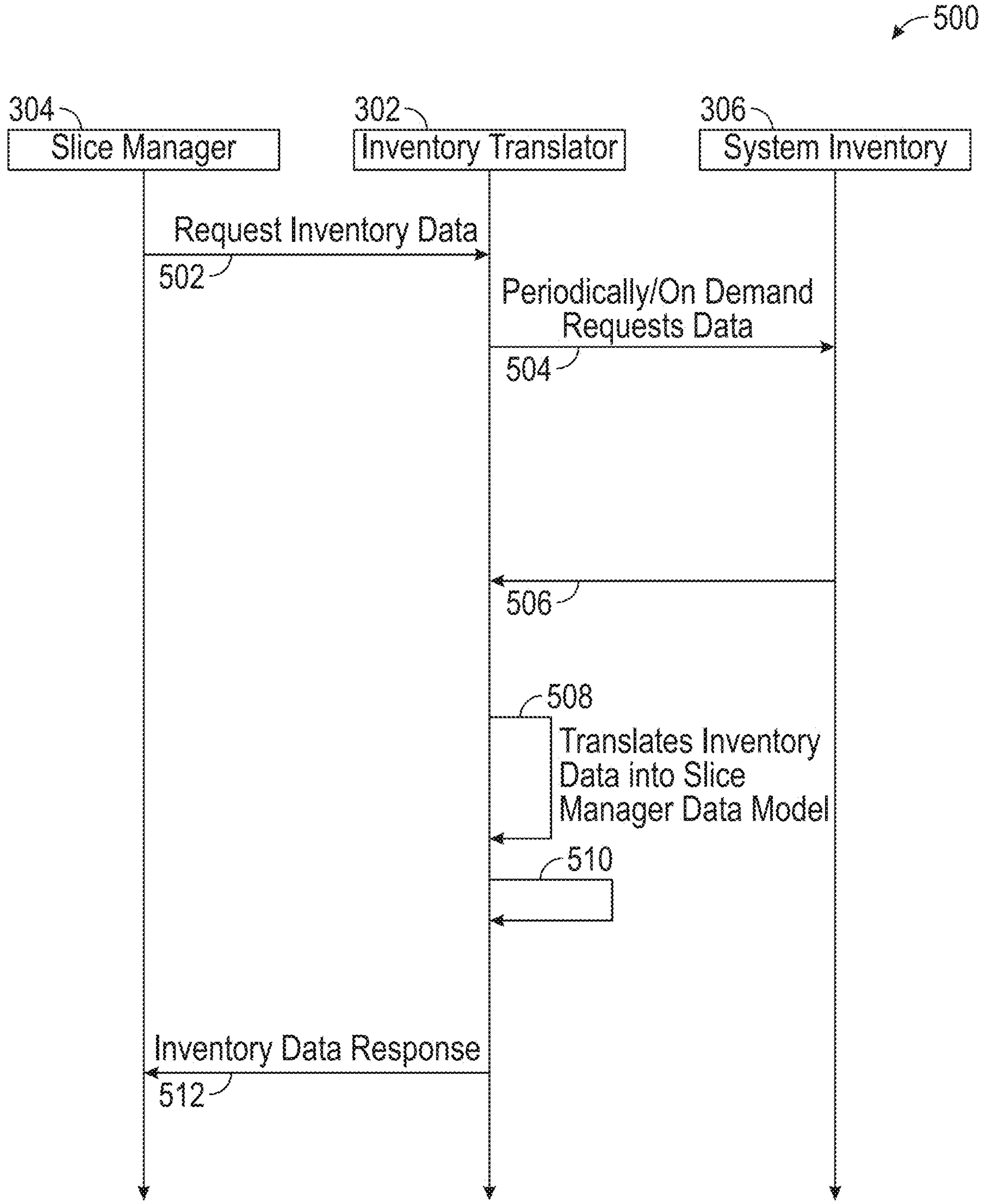
FIG. 5 is an example nSSAI ID rule, in accordance with some embodiments.

FIG. 5 is a data flow diagram of a method for translating inventory data for a slice manager 500, in accordance with some embodiments.

FIG. 5 is discussed to provide an understanding of the operation of slice manager inventory translator system 300 and/or inventory translator 302 through method for translating inventory data for a slice manager 500. In some embodiments, for translating inventory data for a slice manager 500 is a functional overview of slice manager inventory translator system 300 and/or inventory translator 302. In some embodiments, method for translating inventory data for a slice manager 500 is executed by processing circuitry 602 discussed below with respect to FIG. 6. In some embodiments, some, or all the operations of method for translating inventory data for a slice manager 500 are executed in accordance with instructions corresponding to instructions 606 discussed below with respect to FIG. 6.

Method for translating inventory data for a slice manager 500 includes operations 502-510, but the operations are not necessarily performed in the order shown. Operations are added, replaced, order changed, and/or eliminated as appropriate, in accordance with the spirit and scope of the embodiments. In some embodiments, one or more of the operations of method for translating inventory data for a slice manager 500 are repeated. In some embodiments, unless specifically stated otherwise, the operations of method for translating inventory data for a slice manager 500 are performed in order.

At operation 502 of method for translating inventory data for a slice manager 500, inventory translator 302 receives a request for inventory data. Process flows from operation 502 to operation 504.

At operation 504 of method for translating inventory data for a slice manager 500, inventory translator 302 requests the inventory data from system inventory 306. In some embodiments, inventory translator 302 periodically makes requests based on inventory requests received. In some embodiments, inventory translator 302 makes on-demand requests for the inventory data. In some embodiments, inventory translator 302 is manually configured to fetch the data from inventory system 306. Process flows from operation 504 to operation 506.

At operation 506 of method for translating inventory data for a slice manager 500, inventory translator 302 receives the data from inventory system 306. Process flows from operation 506 to operation 508.

At operation 508 of method for translating inventory data for a slice manager 500, inventory translator 302 converts the inventory data into the data model called for by slice manager 304. Process flows from operation 508 to operation 510.

At operation 510 of method for translating inventory data for a slice manager 500, in response to successfully converting the data, inventory translator 302 persists the data into transient inventory 310. Process flows from operation 510 to operation 512.

At operation 512 of method for translating inventory data for a slice manager 500, inventory translator 302 sends the requested inventory data to slice manager 304.

Figure 6:
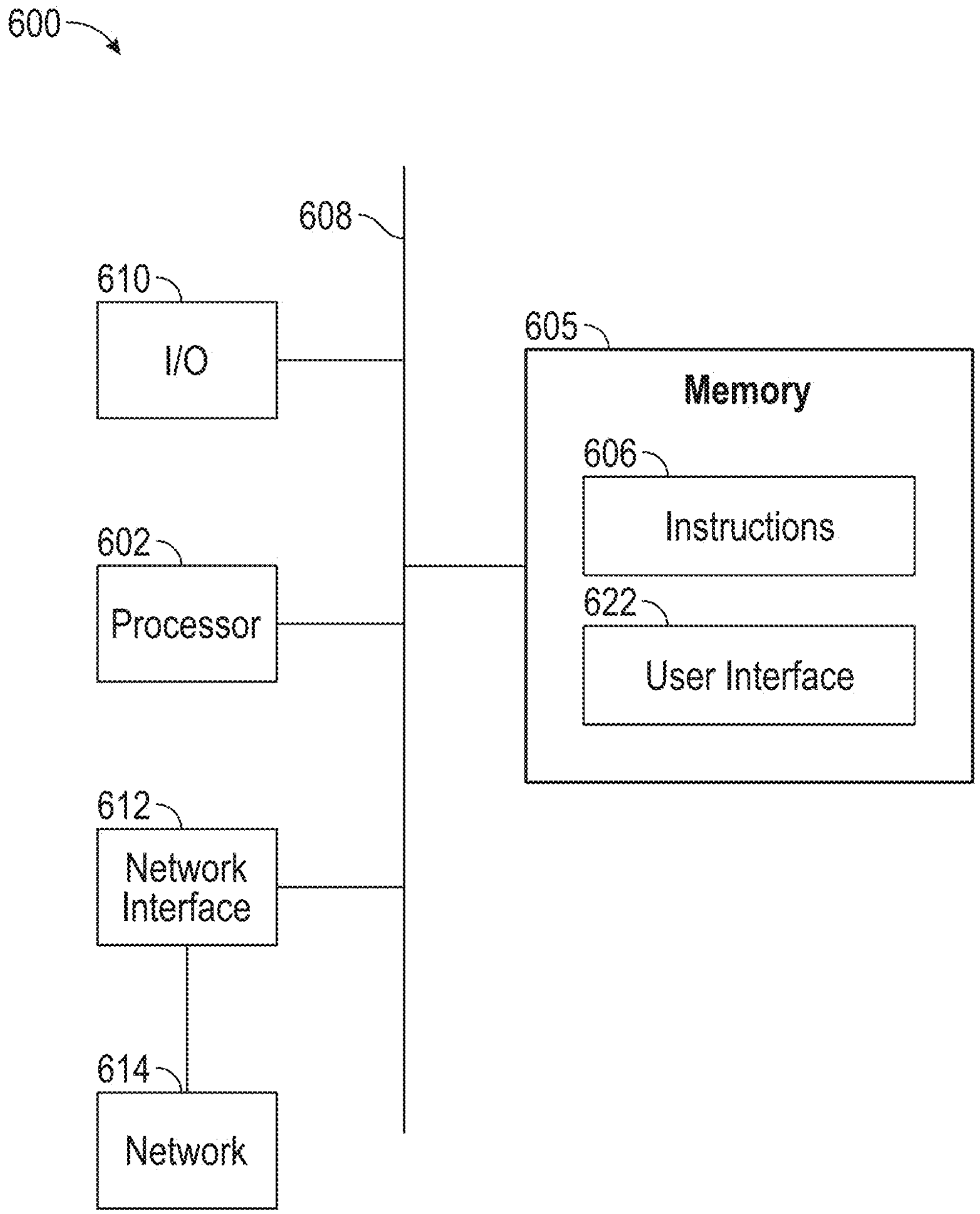
FIG. 6 is a high-level functional block diagram of a processor-based system, in accordance with some embodiments.

FIG. 6 is a block diagram of processing circuitry 600 in accordance with some embodiments. In some embodiments, processing circuitry 600 is a general-purpose computing device including a hardware processor 602 and a non-transitory, computer-readable storage medium 604. Storage medium 604, amongst other things, is encoded with, i.e., stores, computer program code 606, i.e., a set of executable instructions such as an algorithm, or methods 200 and 500. Execution of instructions 606 by hardware processor 602 represents (at least in part) a slice manager inventory translator application which implements a portion, or all the methods described herein in accordance with one or more embodiments (hereinafter, the noted processes and/or methods).

Processor 602 is electrically coupled to a computer-readable storage medium 604 via a bus 608. Processor 602 is further electrically coupled to an I/O interface 610 by bus 608. A network interface 612 is further electrically connected to processor 602 via bus 608. Network interface 612 is connected to a network 614, so that processor 602 and computer-readable storage medium 604 connect to external elements via network 614. Processor 602 is configured to execute computer program code 606 encoded in computer-readable storage medium 604 to cause processing circuitry 600 to be usable for performing a portion or all the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program code 606 configured to cause processing circuitry 600 to be usable for performing a portion or all the noted processes and/or methods. In one or more embodiments, storage medium 604 further stores information, such as an algorithm which facilitates performing a portion or all the noted processes and/or methods.

Processing circuitry 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Processing circuitry 600 further includes network interface 612 coupled to processor 602. Network interface 612 allows Processing circuitry 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, are implemented in two or more processors 602.

Processing circuitry 600 is configured to receive information through I/O interface 610. The information received through I/O interface 610 includes one or more of instructions, data, rules, and/or other parameters for processing by processor 602. The information is transferred to processor 602 via bus 608. Processing circuitry 600 is configured to receive information related to UI 622 through I/O interface 610. The information is stored in computer-readable medium 604 as user interface (UI) 622.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, a method includes receiving, by processor, a request for inventory data from a slice manager; requesting, by the processor, the inventory data from one or more system inventories; receiving, by the processor, the requested inventory data from an inventory; translating, by the processor, the requested inventory data into a slice manager data model; and sending, by the processor, the translated requested data.

In some embodiments, the method further includes storing, by the processor, the translated requested data in a persistent storage.

In some embodiments, the requesting for the inventory data from the one or more system inventories includes periodically requesting the inventory data from the one or more system inventories.

In some embodiments, the requesting for the inventory data from the one or more system inventories includes requesting on demand the inventory data from the one or more system inventories.

In some embodiments, the inventory includes two or more system inventories.

In some embodiments, the method further includes mapping, by the processor, system inventory data to slice manager data.

In some embodiments, the method further includes identifying, by the processor, a vendor that is storing the inventory data in a system inventory.

In some embodiments, the method further includes scheduling, by the processor, system inventory APIs to schedule data translations for one or more utilities.

In some embodiments, an apparatus includes a processor; and a memory having instructions stored thereon that, when executed by the processor, cause the apparatus to receive a request for inventory data from a slice manager; request the inventory data from one or more system inventories; receive the requested inventory data from an inventory; translate the requested inventory data into a slice manager data model; and send the translated requested data.

In some embodiments, the apparatus is further caused to store the translated requested data in a persistent storage.

In some embodiments, the apparatus requests for the inventory data from the one or more system inventories by periodically requesting the inventory data from the one or more system inventories.

In some embodiments, the apparatus requests for the inventory data from the one or more system inventories by requesting on demand the inventory data from the one or more system inventories.

In some embodiments, the inventory includes two or more system inventories.

In some embodiments, the apparatus is further caused to map system inventory data to slice manager data.

In some embodiments, the apparatus is further caused to identify a vendor that is storing the inventory data in a system inventory.

In some embodiments, the apparatus is further caused to schedule system inventory APIs to schedule data translations for one or more utilities.

In some embodiments, a non-transitory computer readable medium having instructions stored thereon that, when executed by a processor, cause an apparatus to receive a request for inventory data from a slice manager; request the inventory data from one or more system inventories; receive the requested inventory data from an inventory; translate the requested inventory data into a slice manager data model; and send the translated requested data.

In some embodiments, the apparatus is further caused to store the translated requested data in a persistent storage.

In some embodiments, the apparatus requests for the inventory data from the one or more system inventories by periodically requesting the inventory data from the one or more system inventories.

In some embodiments, the apparatus requests for the inventory data from the one or more system inventories by requesting on demand the inventory data from the one or more system inventories.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A method comprising:

receiving, by processor, a request for inventory data from a slice manager;

requesting, by the processor, the inventory data from one or more system inventories;

receiving, by the processor, the requested inventory data from at least one of the one or more system inventories;

translating, by the processor, the requested inventory data into a slice manager data model, wherein the translating comprises:

mapping at least one slice identification associated with the requested inventory data to a specific slide identifier (ID) associated with the slice manager data model of the slide manager;

sending, by the processor, the translated requested data;

storing, by the processor, the translated requested data in a persistent storage; and providing, by the processor, the translated requested data in the persistent storage to the slice manager, wherein the slice manager is independently operable of the at least one of the one or more system inventories for a predefined time period based on the stored translated requested data.

2. The method of claim 1, wherein the requesting for the inventory data from the one or more system inventories comprises:

periodically requesting the inventory data from the one or more system inventories.

3. The method of claim 1, wherein the requesting for the inventory data from the one or more system inventories comprises:

requesting on demand the inventory data from the one or more system inventories.

4. The method of claim 1, further comprising deploying a network slice based on the translated requested data, wherein the network slice is a multi-domain network slice.

5. The method of claim 1, further comprising:

mapping, by the processor, the inventory data to slice manager data model.

6. The method of claim 1, further comprising:

identifying, by the processor, one or more vendors that is storing the inventory data in a system inventory; and requesting, by the processor, the inventory data based on the identification.

7. The method of claim 1, further comprising:

scheduling, by the processor, one or more system inventory APIs to schedule data translations for one or more utilities.

8. An apparatus, comprising:

a processor; and a memory having instructions stored thereon that, when executed by the processor, cause the apparatus to:

receive a request for inventory data from a slice manager;

request the inventory data from one or more system inventories;

receive the requested inventory data from at least one of the one or more system inventories;

translate the requested inventory data into a slice manager data model, wherein the processor is configured to translate the requested inventor data by:

mapping at least one slice identification associated with the requested inventory data to a specific slide identifier (ID) associated with the slice manager data model of the slide manager;

send the translated requested data;

store the translated requested data in a persistent storage; and provide the translated requested data in the persistent storage to the slice manager, wherein the slice manager is independently operable of the at least one of the one or more system inventories for a predefined time period based on the stored translated requested data.

9. The apparatus of claim 8, wherein the apparatus requests for the inventory data from the one or more system inventories by:

periodically requesting the inventory data from the one or more system inventories.

10. The apparatus of claim 8, wherein the apparatus requests for the inventory data from the one or more system inventories by:

requesting on demand the inventory data from the one or more system inventories.

11. The apparatus of claim 8, wherein the apparatus is further configured to deploy a network slice based on the translated requested data, wherein the network slice is a multi-domain network slice.

12. The apparatus of claim 8, wherein the apparatus is further caused to:

map the system inventory data to slice manager data model.

13. The apparatus of claim 8, wherein the apparatus is further caused to:

identify one or more vendors that is storing the inventory data in a system inventory; and requesting, by the processor, the inventory data based on the identification.

14. The apparatus of claim 8, wherein the apparatus is further caused to:

schedule one or more system inventory APIs to schedule data translations for one or more utilities.

15. A non-transitory computer readable medium having instructions stored thereon that, when executed by a processor, cause an apparatus to:

receive a request for inventory data from a slice manager;

request the inventory data from one or more system inventories;

receive the requested inventory data from at least one of the one or more system inventories;

translate the requested inventory data into a slice manager data model, wherein the instructions cause the apparatus to translate the requested inventor data by:

mapping at least one slice identification associated with the requested inventory data to a specific slide identifier (ID) associated with the slice manager data model of the slide manager;

send the translated requested data;

store the translated requested data in a persistent storage; and provide the translated requested data in the persistent storage to the slice manager, wherein the slice manager is independently operable of the at least one of the one or more system inventories for a predefined time period based on the stored translated requested data.

16. The non-transitory computer readable medium of claim 15, wherein the apparatus requests for the inventory data from the one or more system inventories by:

periodically requesting the inventory data from the one or more system inventories.

17. The non-transitory computer readable medium of claim 15, wherein the apparatus requests for the inventory data from the one or more system inventories by:

requesting on demand the inventory data from the one or more system inventories.

* * * * *